United States Patent Office 3,028,368
Patented Apr. 3, 1962

3,028,368
POLYMERIC ORGANO-BORON COMPOUNDS AND THEIR PREPARATION
William David English, Garden Grove, Allen L. McCloskey, Orange, and Howard Steinberg, Fullerton, Calif., assignors to United States Borax & Chemical Corporation, Los Angeles, Calif., a corporation of Nevada
No Drawing. Filed Aug. 10, 1959, Ser. No. 832,430
12 Claims. (Cl. 260—77.5)

The present invention is a continuation-in-part of our previously filed application bearing Serial Number 746,-325 and dated July 3, 1958, now abandoned.

This invention relates as indicated to polymeric organo-boron compounds and has more particular reference to polymeric tris(alkylureido)boranes and methods for preparing the same.

Various types of organo-boron compounds are well known and described in the literature. Of the known polymeric organo-boron compounds those having boron bonded to a nitrogen atom are of special interest; however, prior methods of preparing these materials are not completely satisfactory.

It is an object of this invention to provide new polymers containing boron, nitrogen and carbon in the polymer chain, the boron being bonded to nitrogen atoms.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises poly-[tris(dialkylureido)boranes] having a molecular weight of at least about 10,000 and having as the recurring structural unit

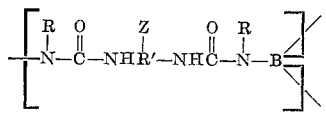

wherein R is a material selected from the class consisting of the alkyl and aryl radicals derived from tris(alkylamino)boranes said alkyl group having from 1–12 carbon atoms, and tris(arylamino)boranes said aryl group selected from the class consisting of phenyl and substituted phenyl radicals and said substituents selected from the class consisting of alkyl and alkoxy radicals having one carbon atom, R' is a material selected from the class consisting of the alkylene radicals derived from alkylene diisocyanates having from 1–12 carbon atoms, the arylene radicals derived from unsubstituted arylene diisocyanates having from 6–12 carbon atoms, the arylene radicals derived from substituted arylene diisocyanates having from 6–28 carbon atoms and said substituents selected from the class consisting of alkyl and alkoxy radicals having one carbon atom, the arylene radicals derived from unsubstituted arylene triisocyanates having from 6–12 carbon atoms and the arylene radicals derived from substituted arylene triisocyanates having from 6–28 carbon atoms and said substituents selected from the class consisting of alkyl and alkoxy radicals having one carbon atom, when R' is derived from a diisocyanate Z is hydrogen and when R' is derived from a triisocyanate Z is the ureido radical

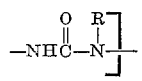

and wherein the boron atoms in said polymer are bonded only to nitrogen atoms.

The present polymeric tris(dialkylureido)boranes are obtained by addition reaction of a tris(alkylamino)borane with a di- or triisocyanate. These poly[tris(dialkylureido)boranes] will be found to be substantially insoluble in all of the common organic solvents and thus their exact molecular weights cannot be determined. However, other methods of determining molecular weights such as end group analyses and light scattering techniques have shown that the present polymers have a molecular weight of at least about 10,000.

So that the present invention is more clearly understood, the following examples are given for illustrative purposes:

I

Hexamethylene diisocyanate (8.4 grams; 0.05 mole) was added dropwise in one hour to a stirred refluxing solution of 9.25 grams (0.05 mole) of tris(isopropylamino)-borane in 46 ml. of dry benzene. A white precipitate formed almost immediately. After the addition was complete, reflux was continued for about one hour. The mixture was then cooled and filtered under nitrogen. The resulting polymeric tris(isopropylureido)borane weighed 10.4 grams when dry. When heated in a capillary it shrinks at 206° C. and partially melts at 208–211° C. This polymer is insoluble in benzene, dioxane, di-n-butyl ether and acetone, and reacts rapidly in methanol. Analysis indicates the material contains 1.57% boron and 17.1% nitrogen.

II

A solution of 10.1 grams (0.06 mole) of hexamethylene diisocyanate in 125 ml. of di-n-butyl ether was added dropwise to a stirred refluxing solution of 11.0 grams (0.06 mole) of tris(isopropylamino)borane in 200 ml. of di-n-butyl ether in about 1.5 hours. After the addition was complete the mixture was heated at reflux for about an additional 1.5 hours. As in Example I a white precipitate formed during the addition. The mixture was filtered hot and yielded 13.6 grams of a white solid. Analysis indicates the polymer contains 2.13% boron and 18.00% nitrogen.

III

A solution of 4.7 grams (0.027 mole) of toluene 2,4-diisocyanate in 100 ml. of xylene was added in about 1.5 hours to a stirred heated solution of 10.0 grams (0.054 mole) of tris(isopropylamino)borane in 250 ml. of xylene. After the addition was complete the mixture was stirred at reflux for about another 12 hours, after which it was cooled and filtered. The resultant solid polymer was insoluble in toluene, xylene and partially soluble in acetone.

IV

A solution consisting of 3.0 grams (0.012 mole) of diphenylmethane p,p'-diisocyanate and 4.44 grams (0.012 mole) of tris(isopropylamino)borane in 300 ml. of benzene reacted to form a white precipitate after about 30 minutes refluxing.

V

A solution consisting of 3.0 grams (0.012 mole) diphenylmethane p,p'-diisocyanate and 5.46 grams (0.024 mole) of tris(t-butylamino)borane in 300 ml. of benzene was stirred for about 12 hours at room temperature and then at reflux for about two hours. The mixture was then stripped of benzene at reduced pressure and room temperature and then heated. At about 200° C. a sudden reaction took place to yield 5.2 grams of a white resin.

VI

A solution of four grams of tris(isopropylamino)borane in 10 ml. of methylene chloride was added dropwise to a solution of eight grams of triphenylmethane p,p',p''-triisocyanate in 200 ml. of methylene chloride. The mixture was stirred at room temperature for about four hours, then allowed to stand for about 64 hours. The precipitate formed was filtered, washed and dried. The yield was 15.9 grams of a grey powder.

VII

A solution of 15 grams (0.052 mole) tris(anilino)borane in 20 ml. of dioxane was added to a solution of 16 grams (0.054 mole) of dianisidine diisocyanate in 200 ml. of dioxane. The mixture was heated to reflux temperature and held at that temperature with stirring for about 48 hours. It was then cooled, filtered under nitrogen, and the solid washed with fresh dioxane. Solvent was removed from the product in a vacuum oven. The yield was 22.3 grams of a pale brown solid which had a boron content of about 1.17%.

While the foregoing examples disclose tris(isopropylamino) or tris(t-butylamino)borane and tris(anilino)-borane as one of the reactants necessary to produce the present polymers, it is to be understood that any tris(alkylamino)borane wherein the alkyl group has from 1–12 carbons and any tris(arylamino)borane where the aryl groups are phenyl or substituted phenyl and the substituents comprise alkyl and alkoxy groups having one carbon atom are applicable to the invention.

The following tris(alkylamino)boranes and tris(arylamino)boranes are typical examples of ingredients which can be used to produce the present polymers:

Tris(methylamino)borane
Tris(ethylamino)borane
Tris(n-propylamino)borane
Tris(isopropylamino)borane
Tris(n-butylamino)borane
Tris(sec-butylamino)borane
Tris(tert-butylamino)borane
Tris(isobutylamino)borane
Tris(amylamino)borane
Tris(sec-amylamino)borane
Tris(tert-amylamino)borane
Tris(hexylamino)borane
Tris(sec-hexylamino)borane
Tris(tert-hexylamino)borane
Tris(heptylamino)borane
Tris(octylamino)borane
Tris(nonylamino)borane
Tris(decylamino)borane
Tris(dodecylamino)borane
Tris(anilino)borane
Tris(xylidino)borane
Tris(toluidino)borane
Tris(anisidino)borane The following list is illustrative of the isocyanates applicable to the present invention:

Hexamethylene diisocyanate
Toluene 2,4-diisocyanate
Diphenylmethane p,p'-diisocyanate
Triphenylmethane p,p'p''-triisocyanate
Dianisidine diisocyanate The proportions of the tri(alkylamino)borane or tris(arylamino)borane and the foregoing isocyanates are not critical. An excess of either reactant can be used if desired.

The poly[tris(dialkyluredio)boranes] of this invention can be used in the preparation of films, shaped objects and fibers. While these polymers are substantially insoluble in the known organic solvents, they can be handled as other substantially insoluble polymers, i.e., nylon, by extrusion or other well-known manufacturing techniques. At temperatures of from about 180–215° C. these materials can be molded under pressure in dies, extruded in the form of films, fibers, tubes, rods, etc. The molded or extruded material when cooled can then be machined, cut, sawed, drilled, etc., by the usual techniques.

Other modes of applying the principle of the invention may be employed, change being made as regards the details described, provided the features stated in any of the following claims or the equivalent of such be employed.

We, therefore, particularly point out and distinctly claim as our invention:

1. A poly[tris(dialkylureido)borane] having a molecular weight of at least about 10,000 and having as the recurring structural unit

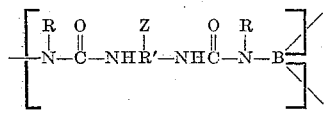

where said polymer consists essentially of said recurring structural units bonded together only through boron to nitrogen bonds and where R is selected from the group consisting of the alkyl and aryl radicals of tris(alkylamino)boranes and tris(arylamino)boranes said alkyl radicals having from 1 to 12 carbon atoms and said aryl radicals selected from the group consisting of phenyl and substituted phenyl said substituents selected from the group consisting of alkyl and alkoxy radicals having one carbon atom, and R' is selected from the group consisting of the alkylene radicals of alkylene diisocyanates said alkylene radicals having from 1 to 12 carbon atoms, the arylene radicals of unsubstitued arylene diisocyanates said arylene radicals having from 6 to 12 carbon atoms, the arylene radicals of substituted arylene diisocyanates said arylene radicals having from 6 to 28 carbon atoms and said substituents selected from the group consisting of alkyl and alkoxy radicals having one carbon atom, the arylene radicals of unsubstituted arylene triisocyanates said arylene radicals having from 6 to 12 carbon atoms and the arylene radicals of substituted arylene triisocyanates said arylene radicals having from 6 to 28 carbon atoms and said substituents selected from the group consisting of alkyl and alkoxy groups having one carbon atom, when R' is selected from the group consisting of alkylene and arylene radicals of diisocyanates Z is hydrogen and when R' is selected from the group of arylene radicals of triisocyanates Z is the ureido radical

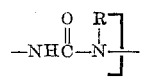

2. A poly[tris(dialkylureido)borane] having a molecular weight of at least about 10,000 and having as the recurring structural unit

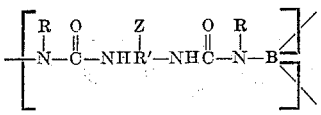

where said polymer consists essentially of said recurring unit bonded together only through boron to nitrogen bonds and where R is an alkyl radical of a tris(alkylamino)borane said alkyl radical having from 1 to 12 carbon atoms, R' is an alkylene radical of an alkylene diisocyanate said alkylene radical having from 1 to 12 carbon atoms and Z is hydrogen.

3. A poly[tris(dialkylureido)borane] having a molecular weight of at least about 10,000 and having as the recurring structural unit

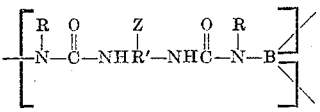

where said polymer consists essentially of said recurring units bonded together only through boron to nitrogen bonds and where R is an aryl radical of a tris(arylamino)borane said aryl radical selected from the group consisting of phenyl and substituted phenyl said substituents selected from the group consisting of alkyl and alkoxy radicals having one carbon atom, R' is an alkylene radical of an alkylene diisocyanate said alkylene radical having from 1 to 12 carbon atoms and Z is hydrogen.

4. A poly[tris(dialkylureido)borane] having a molecular weight of at least about 10,000 and having as the recurring structural unit

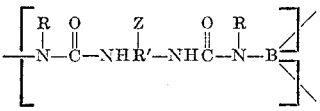

where said polymer consists essentially of said recurring units bonded together only through boron to nitrogen bonds and where R is an alkyl radical of a tris(alkylamino)borane said alkyl radical having from 1 to 12 carbon atoms, R' is an arylene radical of an arylene diisocyanate said arylene radical selected from the group consisting of unsubstituted arylene radicals having from 6 to 12 carbon atoms and substituted arylene radicals having from 6 to 28 carbon atoms said substituents selected from the group consisting of alkyl and alkoxy radicals having one carbon atom and Z is hydrogen.

5. A poly[tris(dialkylureido)borane] having a molecular weight of at least about 10,000 and having as the recurring structural unit

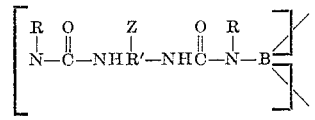

where said polymer consists essentially of said recurring units bonded together only through boron to nitrogen bonds and where R is an aryl radical of a tris(arylamino)borane said aryl radical selected from the group consisting of phenyl and substituted phenyl said substituents selected from the group consisting of alkyl and alkoxyl radicals having one carbon atom, R' is an arylene radical of an arylene diisocyanate said arylene radical selected from the group consisting of unsubstituted arylene radicals having from 6 to 12 carbon atoms and substituted arylene radicals having from 6 to 28 carbon atoms said substituents selected from the group consisting of alkyl and alkoxy radicals having one carbon atom and Z is hydrogen.

6. A poly[tris(dialkylureido)borane] having a molecular weight of at least about 10,000 and having as the recurring structural unit

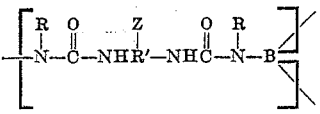

where said polymer consists essentially of said recurring units bonded together only through boron to nitrogen bonds and where R is an alkyl radical of a tris(alkylamino)borane said alkyl radical having from 1 to 12 carbon atoms, R' is an arylene radical of an arylene triisocyanate said arylene radical selected from the group consisting of unsubstituted arylene radicals having from 6 to 12 carbon atoms and substituted arylene radical having from 6 to 28 carbon atoms said substituents selected from the group consisting of alkyl and alkoxy radicals having one carbon atom and Z is the ureido radical

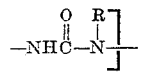

7. A poly tris(dialkylureido)borane] having a molecular weight of at least 10,000 and having as the recurring structural unit

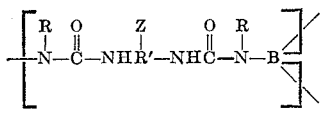

where said polymer consists essentially of said recurring units bonded together only through boron to nitrogen bonds and where R is an aryl radical of a tris(arylamino)borane said aryl radical selected from the group consisting of phenyl and substituted phenyl, said substituents selected from the group consisting of alkyl and alkoxy radicals having one carbon atom, R' is an arylene radical of an arylene triisocyanate, said arylene radical selected from the group consisting of unsubstituted arylene radicals having from 6 to 12 carbon atoms and substituted arylene radicals having from 6 to 28 carbon atoms, said substituents selected from the group consisting of alkyl and alkoxy radicals having one carbon atom, and Z is the ureido radical

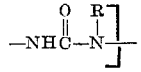

8. A poly tris(dialkylureido)borane] having a molecular weight of at least about 10,000 and having as the recurring structural unit

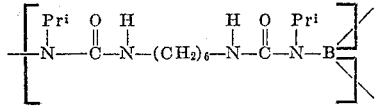

where said polymer consists essentially of said recurring unit bonded together only through boron to nitrogen bonds.

9. A poly[tris(dialkylureido)borane] having a molecular weight of at least about 10,000 and having as the recurring structural unit

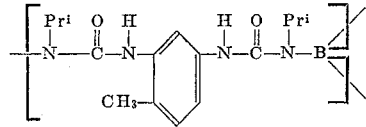

where said polymer consists essentially of said recurring unit bonded together only through boron to nitrogen bonds.

10. A poly[tris(dialkylureido)borane] having a molecular weight of at least about 10,000 and having as the recurring structural unit

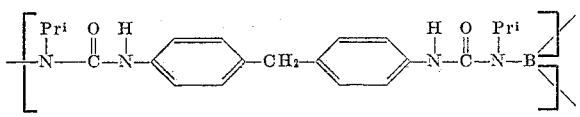

where said polymer consists essentially of said recurring structural units bonded together only through boron to nitrogen bonds.

11. A poly[tris(dialkylureido)borane] having a molecular weight of at least about 10,000 and having as the recurring structural unit

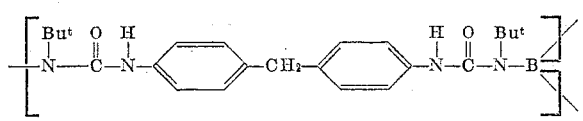

where said polymer consists essentially of said recurring structural units bonded together only through boron to nitrogen bonds.

12. A poly[tris(dialkylureido)borane] having a molecular weight of at least about 10,000 and having as the recurring structural unit

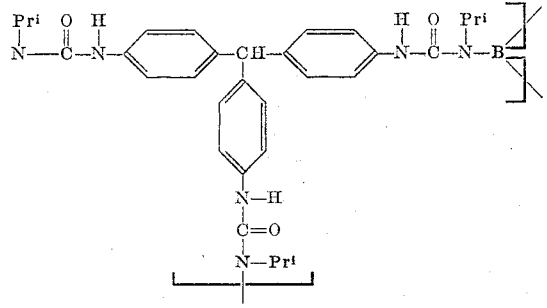

where said polymer consists essentially of said recurring structural units bonded together only through boron to nitrogen bonds.

References Cited in the file of this patent
UNITED STATES PATENTS

| | | |
|---|---|---|
| 2,424,883 | Habgood | July 29, 1947 |
| 2,517,945 | Upson | Aug. 8, 1950 |
| 2,729,618 | Huller et al. | Jan. 3, 1956 |
| 2,864,780 | Katz | Dec. 16, 1958 |
| 2,945,841 | Aries | July 19, 1960 |